Patented June 24, 1930

1,765,597

UNITED STATES PATENT OFFICE

HERBERT EUGENE MALONE, OF RIVERSIDE, AND RALPH WILLIAM PRYOR, OF LA GRANGE, ILLINOIS, ASSIGNORS TO WESTERN ELECTRIC COMPANY, INCORPORATED, OF NEW YORK, N. Y., A CORPORATION OF NEW YORK

COMPOSITION OF MATTER

No Drawing. Application filed July 7, 1926. Serial No. 121,049.

This invention relates to compositions of matter, and more particularly to red hard rubber compositions.

In the production of compositions of matter, such as red hard rubber compounds, it has been the usual practice to employ large quantities of vermilion as the pigment or coloring material. In view of the fact that vermilion which forms the major portion of such compounds is a comparatively expensive substance, it is desirable to substitute therefor cheaper substances without, however, departing from the established color standards.

An object of the present invention is the production of a red composition of matter from comparatively inexpensive coloring ingredients which has improved physical properties.

The invention contemplates the production of an inexpensive combination of coloring pigments whose colors will blend so as to produce a color of the same shade as produced solely by vermilion. In accordance with one embodiment, the invention contemplates the use of a coloring material in a red hard rubber composition comprising vermilion, lithopone and india rubber yellow.

One of the formulæ heretofore used in red hard rubber composition comprises the following ingredients in the following proportions by weight:

| | Per cent |
|---|---|
| Smoked sheet rubber | 23.00 |
| Sulphur | 8.00 |
| Vermilion | 67.75 |
| Cottonseed oil | 1.25 |

Experiments conducted in replacing substantial amounts of the vermilion by a relatively inexpensive white pigment, such as lithopone, frequently used in rubber compounds, indicated that the resulting composition was not entirely satisfactory due to the fact that it exhibited a tint of a bluish cast. It was found, however, by further experimentation that by adding a small amount of a yellow pigment, india rubber yellow, also relatively inexpensive, the bluish tint was completely counteracted and the shade of red produced was the same as that produced by vermilion alone.

The following ingredients and their proportions by weight will serve to illustrate a composition compounded in accordance with this invention:

| | Per cent |
|---|---|
| Smoked sheet rubber | 26.50 |
| Sulphur | 8.00 |
| Vermilion | 49.25 |
| Cottonseed oil | 1.50 |
| Lithopone | 12.00 |
| India rubber yellow | 2.75 |

This composition has greatly improved physical characteristics over a composition in which vermilion alone is used as a coloring material. It has a lower specific gravity and higher tensile and transverse breaking strengths and may be produced at a greatly reduced cost.

As a matter of convenience in producing a composition in accordance with this invention the india rubber yellow (arsenic sulphide), which is a poison in concentrated form, is mixed with the rubber first to reduce the hazard of handling a concentrated poisonous substance in the remainder of the process.

It will be understood that the embodiment of the invention herein described and illustrated is merely a useful form of the invention which is capable of widely different modification without departing from the spirit and scope of the invention.

What is claimed is:

1. A composition of matter comprising rubber 26.5%, sulphur 8%, vermilion 49.25%, cottonseed oil 1.5%, lithopone 12%, and india rubber yellow 2.75%.

2. In a red hard rubber composition, coloring material consisting of vermilion, lithopone, and india rubber yellow, the vermilion comprising 49.25%, the lithopone 12%, and the india rubber yellow 2.75% of the total composition.

3. A composition of matter comprising rubber, sulphur, vermilion, cotton seed oil, lithopone, and india rubber yellow, in which the vermilion comprises 49.25%, the lithopone 12% and the india rubber yellow 2.75% of the total composition.

4. A composition of matter comprising the following ingredients in substantially the following proportions: 26.5% of crude rubber, 8% of a vulcanizing agent, 49.25% of vermilion, 12% of a white pigment, and 2.75% of india rubber yellow.

In witness whereof we hereunto subscribe our names this 25 day of June A. D., 1926.

HERBERT EUGENE MALONE.
RALPH WILLIAM PRYOR.